US008875144B2

(12) United States Patent
van Riel

(10) Patent No.: US 8,875,144 B2
(45) Date of Patent: Oct. 28, 2014

(54) USING A YIELD INDICATOR IN A HIERARCHICAL SCHEDULER

(75) Inventor: Henri Han van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 351 days.

(21) Appl. No.: 13/041,882

(22) Filed: Mar. 7, 2011

(65) Prior Publication Data

US 2012/0233623 A1 Sep. 13, 2012

(51) Int. Cl.
*G06F 9/46* (2006.01)
*G06F 9/48* (2006.01)

(52) U.S. Cl.
CPC .................................. *G06F 9/4881* (2013.01)
USPC ....................................................... 718/102

(58) Field of Classification Search
None
See application file for complete search history.

(56) References Cited

U.S. PATENT DOCUMENTS

| 4,965,718 | A  | * | 10/1990 | George et al. ................. 718/104 |
| 6,434,591 | B1 | * | 8/2002  | Watakabe et al. ............. 718/103 |
| 7,089,557 | B2 | * | 8/2006  | Lee ................................ 718/102 |
| 2009/0158294 | A1 | * | 6/2009 | Perticara' ..................... 718/106 |

OTHER PUBLICATIONS

CFS Group Scheduling [posted on Jul. 2, 2007 by corbet]; copyright 2007 Eklektix, Inc.; printed from Internet on Mar. 7, 2011: http://lwn.net/Articles/240474; 2 pages.

* cited by examiner

*Primary Examiner* — Emerson Puente
*Assistant Examiner* — Sisley Kim
(74) *Attorney, Agent, or Firm* — Lowenstein Sandler LLP

(57) ABSTRACT

A method and system for scheduling the use of CPU time among processes using a scheduling tree having a yielding indicator. A scheduling tree represents a hierarchy of groups and processes that share central processing unit (CPU) time. A computer system assigns a yield indicator to a first node of the scheduling tree, which represents a first process that temporarily yields the CPU time. The computer system also assigns the yield indicator to each ancestor node of the first node in the scheduling tree. Each ancestor node represents a group to which the first process belongs. The computer system then selects a second process to run on the computer system based on the yield indicator in the scheduling tree.

15 Claims, 5 Drawing Sheets

USING A YIELD INDICATOR IN A HIERARCHICAL SCHEDULER

TECHNICAL FIELD

Embodiments of the present invention relate to a computer system, and more specifically, to task scheduling in a computer system.

BACKGROUND

Hierarchical scheduling is a technique for allocating CPU time among groups of processes (or equivalently, tasks or threads) in a multitasking environment. A hierarchical scheduler allows a scheduler (represented by the root of a scheduling tree) to allocate CPU time to a hierarchy of run queues, with each run queue containing a group of runnable processes. For example, the scheduler allocates the CPU time of a CPU to groups or processes, which are one-level below the root in the hierarchy. Each of these groups and processes partitions the CPU time that it is allocated with among its subgroups or sub-processes. Allocation of the CPU time continues among the children and descendants of the subgroups/sub-processes until a leaf of the scheduling tree is reached.

A hierarchical scheduler can be used to enforce fairness among processes and groups. For example, suppose that Alice has 10 processes to run and Ben has 40 processes to run. A hierarchical scheduler can treat Alice's 10 processes as one group and Ben's 40 processes as another group, and allocate 50% of CPU time to each of Alice's group and Ben's group. The hierarchical scheduler can enforce fairness between Alice's group and Ben's group. Once the scheduler decides who deserves the CPU time, it will perform fair scheduling among that user's processes. In addition to per-user-based groups, processes can also be organized based on user's roles, process types, or any categories that a system administrator sees fit.

In a multitasking environment, it is often useful for a program or process to temporarily yield the CPU time to another process; e.g., when the other process is holding a resource that the current process needs to make progress. With a classical round-robin scheduler, the yielding process is placed at the back of the run queue. As a result, the yielding process will lose its fair share of CPU time as it has to wait for all of the other processes in the run queue. A hierarchical scheduler does not maintain all of its processes in a linear run queue. Rather, a conventional hierarchical scheduler may assign the yielding process a very low priority, which would be the same (or similar) priority assigned to a process that has consumed a lot of CPU time. However, if the group that contains the yielding process keeps its current high priority, the group, as well as the yielding process, may get selected again. Thus, assigning the yielding process a very low priority may not achieve anything, unless the priority of its group (that contains the yielding process) is also adjusted. Conversely, adjusting the group priority would penalize all of the processes in the group, not just the yielding process. Therefore, there is a need for a hierarchical scheduler to properly manage a yielding process while maintaining scheduling fairness.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for scheduling the use of CPU time among processes using a scheduling tree having a yielding indicator. In one embodiment, a scheduling tree represents a hierarchy of groups and processes that share central processing unit (CPU) time. A computer system assigns a yield indicator to a first node of the scheduling tree, which represents a first process that temporarily yields the CPU time. The computer system also assigns the yield indicator to each ancestor node of the first node in the scheduling tree. Each ancestor node represents a group to which the first process belongs. The computer system then selects a second process to run on the computer system based on the yield indicator in the scheduling tree.

Embodiments of the present invention allow a hierarchical scheduler to schedule CPU time with fairness when a process yields to another process during runtime. The scheduler updates a scheduling tree with a "yield" indicator when receiving a "yield to" call from the yielding process. The yield indicator indicates the yielding process and the groups to which the yielding process belongs. In one embodiment, the scheduler may also update the scheduling tree with a "next" indicator, which indicates a preferred process to run next. Based on predetermined rules and the information in the scheduling tree having the yield indicator (and, in some embodiments, with both the yield indicator and the next indicator), the scheduler selects a candidate process to run on the computer system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
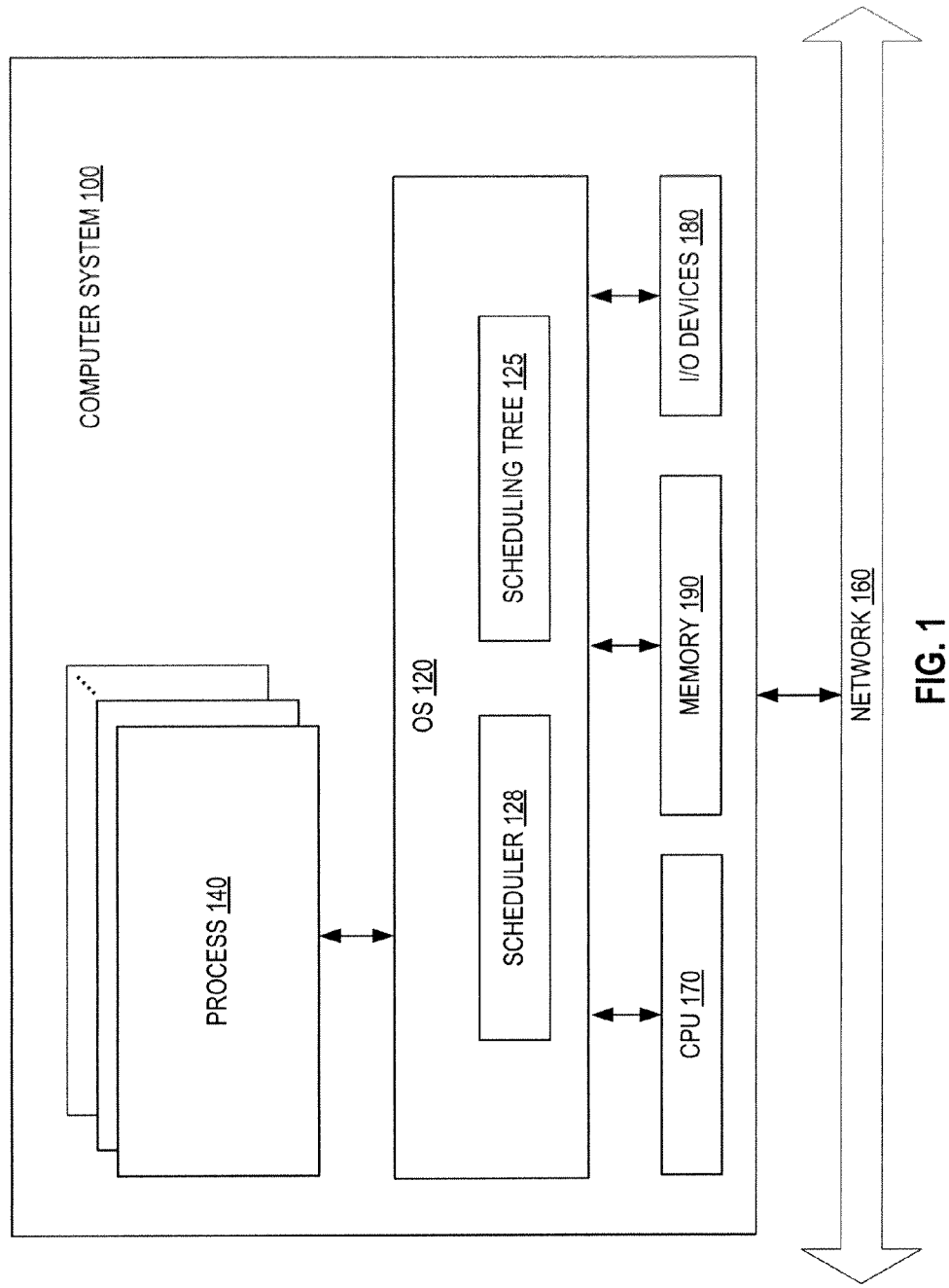
FIG. 1 is a block diagram of a computer system in which embodiments of the present invention may operate.

FIG. 1 is a block diagram that illustrates embodiment of a computer system 100 in which embodiments of the present invention may operate. The computer system 100 may be a server, a workstation, a personal computer (PC), a mobile phone, a palm-sized computing device, a personal digital assistant (PDA), etc. The computer system 100 runs an operating system (OS) 120 to manage its resources, such as one or ore central processing units (CPUs) 170, memory 190, and I/O devices 180. The computer system 100 runs one or more processes 140 (or equivalently, "threads," "tasks"). Each process 140 may be a program or a thread of a multi-threaded program. Each process 140 may be a user-space process or a system-level process. Further, each process 140 may run on the host (that is, the computer system 100) or on a virtual machine hosted by the computer system 100.

In one embodiment, the computer system 100 includes a scheduler 128, which schedules the use of CPU time by the process 140. The scheduler 128 may be part of the host OS 120. In an embodiment where the processes 140 are guest processes running on virtual machines, the scheduler 128 may be part of a hypervisor, which, in turn, may be part of the host OS 120. The hypervisor may also be known as a virtual machine monitor (VMM) or a kernel-based hypervisor.

In one embodiment, the computer system 100 is accessible by remote systems via a network 160. The network 160 may be a private network (e.g., a local area network (LAN), a wide area network (WAN), intranet, etc.) or a public network (e.g., the Internet).

According to one embodiment of the present invention, the scheduler 128 maintains a scheduling tree 125 for each CPU 170, and schedules the use of the CPU time based on the scheduling tree 125. In one embodiment, the scheduling tree 125 is a binary tree structure, which may be stored in the internal memory of the OS 120. The root of the scheduling tree 125 represents the total CPU time (per CPU) to be scheduled. Each internal node of the scheduling tree 125 represents either a group of processes or a process. A group is the root of a "lower-level" tree, which in itself can have any number of processes or groups inside it. Thus, it is possible for a scheduling tree to contain any number of runnable processes without any groups, or any combination of groups and/or runnable processes. In one embodiment, each leaf node of the scheduling tree 125 represents a runnable process, which is a process ready to run and is not currently waiting on a non-kernel event (e.g., a user input). However, a runnable process may sometimes need to yield to another runnable process when a needed resource is not readily available. For example, the yielding process may be waiting on a kernel process, such as waiting for access to a locked memory, which is to be unlocked by another process.

In one embodiment, the scheduler 128 dynamically assigns one or more yield indicators to the scheduling tree 125 to indicate that a process (that is, a "yielding process," such as the process 140) is yielding the CPU time to another process. When the process 140 yields, the process 140 makes a call to alert the scheduler 128 that it can release the CPU time and another process can be run. The scheduler 128 marks the scheduling tree 125 with one or more yield indicators, which guides the scheduler 128 in the selection of a candidate process to run next by the CPU 170. In one embodiment, the nodes in the scheduling tree 125 that represent the yielding process and the groups containing the yielding process are tagged with the yield indicators.

With the use of the yield indicators, a yielding process can temporarily give up CPU time without giving up its group's fair share of the CPU time. When selecting a candidate process to run, the scheduler 128 will skip the yielding process and select a candidate process that may be in the same group of the yielding process or in a different group.

In one embodiment, the yielding process 140 may also indicate which other process is preferred to be run next. In response, the scheduler 128 dynamically signs one or more next indicators to the scheduling tree 125 to guide the scheduler 128 in the selection of a candidate process to run next. In some embodiments, the next indicators can also be assigned in response to some other processes which are not the yielding process. The leaf node tagged with the next indicator may represent a process (a "next process") that should wake up from a sleep state, or a process to which the yielding process is about to yield. In addition to tagging the leaf nodes representing the yielding process and the next process, the scheduler 128 also tags the ancestor nodes of these leaf nodes in the scheduling tree 125 with yield indicators and next indicators, respectively.

In one embodiment, when selecting a candidate process to run, the scheduler 28 may ignore the next indicators and select a process that is not tagged with the next indicator. This may happen when the next process or the group to which the next process belongs has already consumed too much CPU time.

Figure 2:
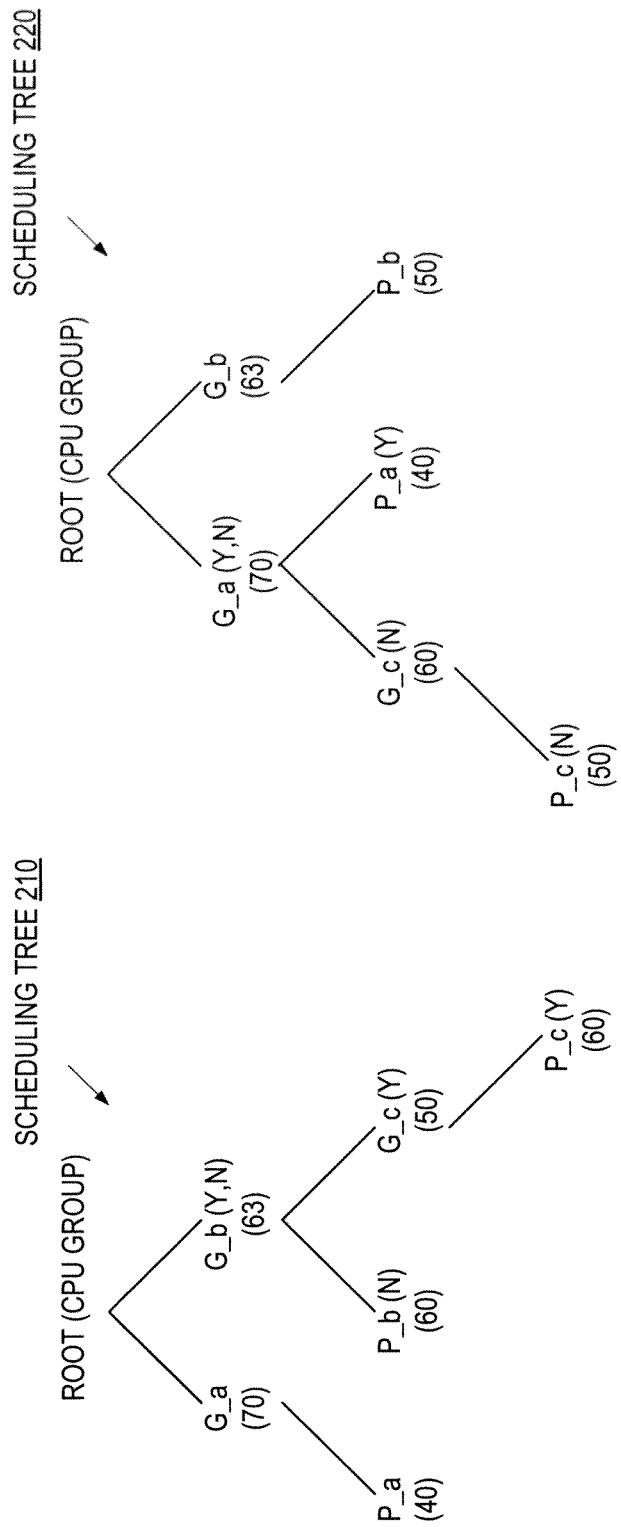
FIG. 2 illustrates examples of a scheduling tree that is tagged by yield indicators.

FIG. 2 illustrates a scheduling tree 210 and a scheduling tree 220, which are examples of the scheduling tree 125 of FIG. 1. The root of the scheduling tree 210 represents a CPU group that contains all of the processes sharing the time of the same CPU. Each internal node represents a group (G_a, G_b, or G_c) and each leaf node represents a process (P_a, P_b, or P_c). Each node is associated with a numerical value or points indicating its priority in the scheduling tree 220. In one embodiment, the priority is assigned, at least in part, based on the CPU time that a process or a group has consumed. A process with higher priority (indicated by a larger numerical value) has consumed less CPU time compared to a process with lower priority. In one embodiment, the scheduling tree 210 is sorted such that a node's left branch leads to a child node of a higher priority and its right branch leads to a child node of a lower priority. In one embodiment, the scheduler 128 uses the priorities to maintain fairness in the selection of a candidate process to run.

In the example of the scheduling tree 210, the first level (the level nearest to the root) of the tree includes two groups G_a and G_b. G_a contains one runnable process P_a. G_b is further divided into a process P_b and a subgroup G_c, and subgroup G_c contains one runnable process P_c. Suppose that P_c is currently running but needs to yield to another process. P_c makes a call to the scheduler 128, which indicates that it is going to yield and a preferred next process is P_b. The control then transfers to the scheduler 128. The scheduler 128 tags the P_c node with a yield indicator (indicated in FIG. 2 by (Y)), and moves up a level in the scheduling tree 210 to tag the ancestor nodes of P_c node (that is, G_c node and G_b node) with the yield indicators. The tagging stops when the scheduler 128 reaches the root.

Subsequently, the scheduler 128 tags the P_b node with a next indicator (indicated in FIG. 2 by (N)) and continues to tag all of the ancestor nodes of P_b node with the next indicators. Since G_b node is an ancestor node of both P_b and P_c, G_b is tagged with both a yield indicator and a next indicator (indicated in FIG. 2 by (Y,N)). At any given time, an internal node (e.g., G_b) may be tagged by both of a yield indicator and a next indicator at the same time. That is, a yield indicator and a next indicator may be present in the same subtree at the same time. However, a leaf node cannot be tagged by both of the yield indicator and the next indicator at the same time. In some scenarios, at any given time, an internal node (e.g., G_a) may be tagged by neither a yield indicator nor a next indicator, or (e.g., G_c) tagged by either a yield indicator or a next indicator.

As another example, the scheduling tree 220 can also be tagged with a similar process as described above with respect to the scheduling tree 210.

In one embodiment, the yield indicator and the next indicator can be implemented by pointers. In one embodiment, the scheduling tree 210 (or 220) maintains three pointers at each level of the tree: a yield pointer, a next pointer and a last pointer. The last pointer points to the process that ran immediately before the currently running process, and its use is not germane to the subject matter of the disclosure. The yield pointer implements the yield indicator and the next pointer implements the next indicator. At each level of the scheduling tree 210 (or 220), the scheduler 128 points the yield pointer to the node representing the yielding process or a group containing the yielding process, and points the next pointer to the node representing the next process or a group containing the next process. Thus, at any given time, at most one node at each level of the tree can be pointed to by a yield pointer. Similarly, at any given time, at most one node at each level of the tree can be pointed to by a next pointer.

After tagging the scheduling tree 210 (or 220) with appropriate indicators, the scheduler 128 moves from the root towards the leaves to select a candidate process to run next. The scheduler 128 selects a process using the yield indicators and next indicators as a hint. Generally, the scheduler 128 avoids selecting a group with a yield indicator. However, in some scenarios, it may be necessary for the scheduler 128 to select a group having a yield indicator. A group having the yield indicator may be selected if (1) the group also has the next indicator, or (2) there is no other group from which to select. The selection of a candidate process is described in greater detail in connection with FIG. 4.

Figure 3:
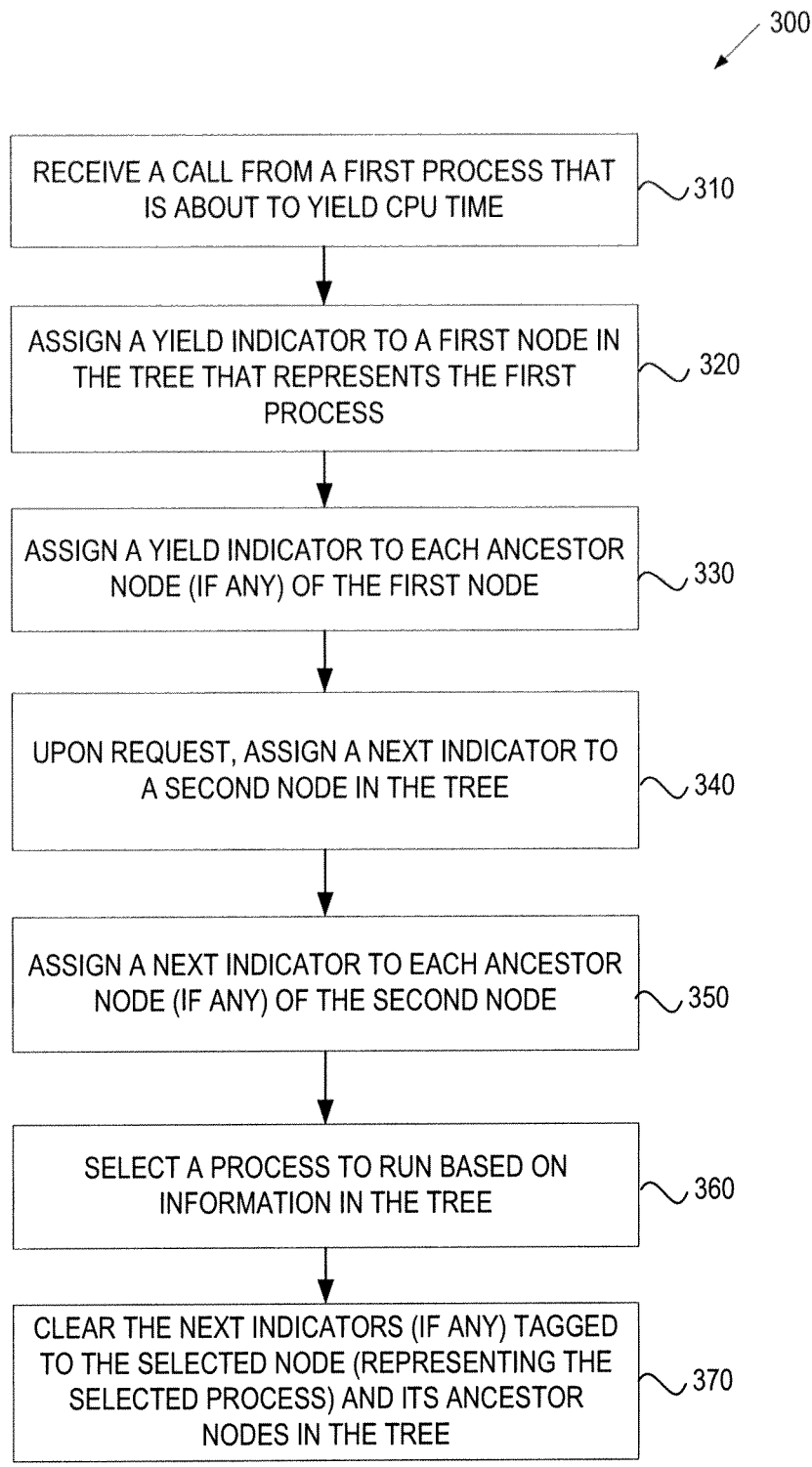
FIG. 3 is a flow diagram of one embodiment of a method for scheduling processes with a scheduling tree.

FIG. 3 is a flow diagram illustrating one embodiment of a method 300 for dynamically tagging a scheduling tree with yield indicators. The method 300 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 300 is performed by the scheduler 128 of FIG. 1.

Referring to FIG. 3, in one embodiment, the scheduler 128 receives a call from a first process, which is going to yield CPU time to another process (block 310). In response, the scheduler 128 assigns a yield indicator to the node ("first node") of the scheduling tree that represents the first process (block 320). The scheduler 128 assigns a yield indicator to each of the ancestor nodes (if there are any) of the first node (block 330). In one embodiment, the call made by the first process may indicate a second process as a preferred process to run next. Alternatively, another process may indicate to the scheduler 128 that it prefers the second process to run next. In response, the scheduler 128 assigns a next indicator to the second node (block 340) and each ancestor node (if there are any) of the second node in the tree (block 350). Based on the information in the tree, the scheduler 128 selects a candidate process to run next (block 360). A method for selecting a candidate process to run is described in detail below in connection with FIG. 4. After selection of the candidate process, the scheduler 128 clears the next indicators (if there are any) tagged to the selected node (representing the selected process) and its ancestor nodes in the tree (block 370). The yield indicators are also cleared.

Figure 4:
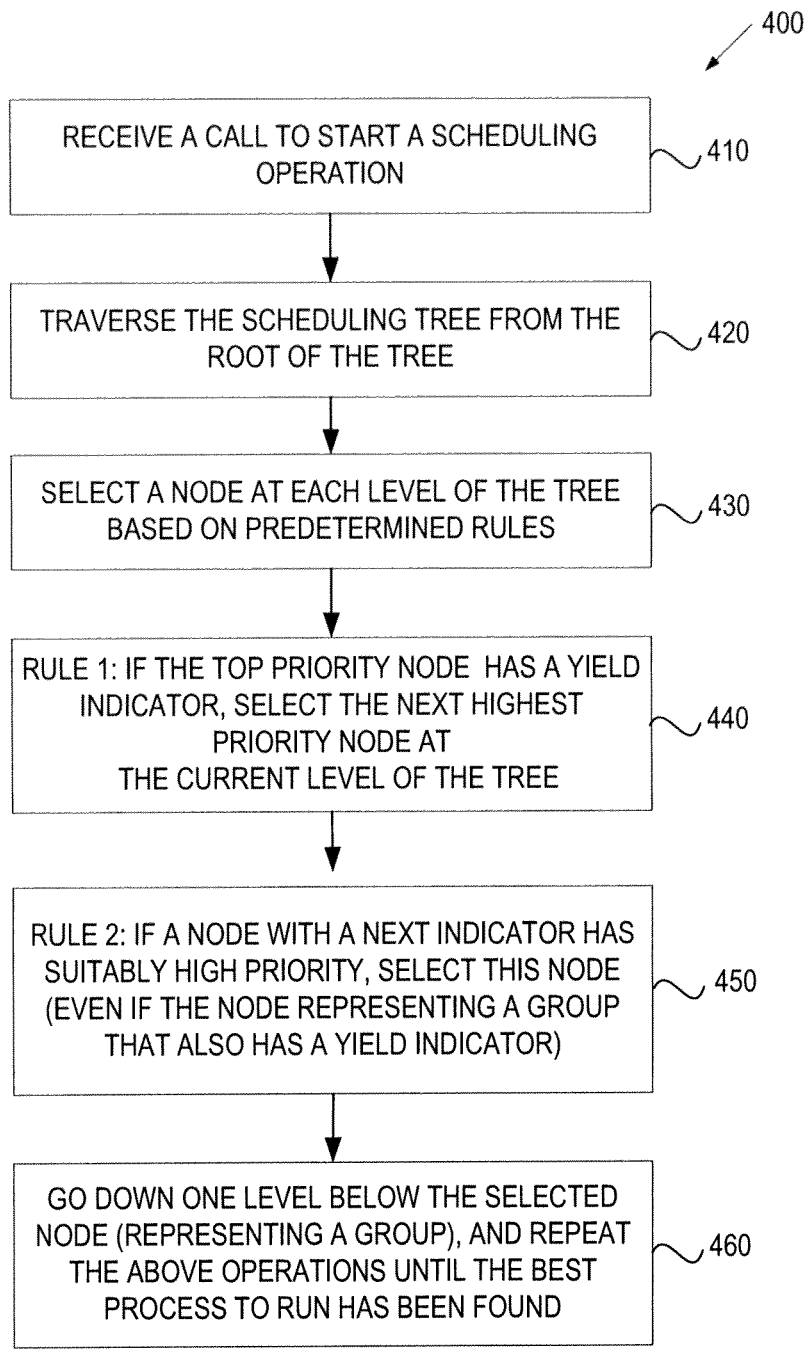
FIG. 4 is a flow diagram of one embodiment of a method for selecting a candidate process to run using a scheduling tree.

FIG. 4 is a flow diagram illustrating one embodiment of a method 400 for selecting a candidate process to run based on the information provided by a scheduling tree. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the scheduler 128 of FIG. 1.

Referring to FIG. 4, in one embodiment, the method 400 begins when the scheduler 128 receives a call to start a scheduling operation; for example, after a yielding process calls the scheduler 128 to indicate that it wants another process to run (block 410). The scheduler 128 traverses a scheduling tree from the root toward the leaves of the scheduling tree (block 420). Each node of the scheduling tree is associated with a priority, which is the priority assigned to the group or the process represented by the node. At each level of the tree, the scheduler 128 selects a node (which may represent a group or a process) based on predetermined rules (block 430). The selection continues if the selected node represents a group. The selection ends if the selected node represents a process (i.e., when a leaf node is selected).

In one embodiment, the predetermined rules includes Rule 1, which states that if the top priority node (which represents a group or a process) has a yield indicator, then the scheduler 128 should select the next highest priority node (which represents a group or a process) at the current level of the scheduling tree (block 440). However, Rule 1 may be overruled by Rule 2, which states that if a node (which represents a group or a process) with a next indicator has suitably high priority, then the scheduler 128 should select the node (block 450). If the node represents a group, the scheduler 128 should select this group even if the group also has a yield indicator. After selecting a node that represents a group, the scheduler 128 goes down one level below the selected node, and repeats the above operations until the best process to run has been found (block 460).

In one embodiment, the "suitably high priority" in Rule 2 can be defined as a priority that is within a predetermined acceptable range (which may be numerical points or a percentage) of the top priority at the same level of the tree. For example, if the top priority at a level is 70, the next highest priority at the same level is 63 and the acceptable range is 10 points off the top, a priority of 63 is "suitably high" because it is less than 10 points away from the top priority of 70.

However, if the priority of the group with the next indicator were to fall more than 10 points below the priority of the top priority group (or process), then it will not be selected. The use of next indicators combined with priorities allows processes to continuously set the next indicator to another process that they want to run, without endangering fairness of the system.

The method 400 can be explained using the examples illustrated in FIG. 2. At the top level of the scheduling tree 210, the top priority group G_a does not have a yield indicator. Therefore, Rule 1 does not apply here. According to Rule 2, since G_b (the group with the next indicator) has suitably high priority (63 is less than 10 points away from the top priority of 70), G_b is selected. At the next level of the tree, since process P_b has the next indicator and G_c has the yield pointer, P_b is selected as the candidate process to run next.

As another example, at the top level of the scheduling tree 220, the top priority group G_a has both a yield indicator and a next indicator. According to Rule 1, G_b should be selected because it is the next highest priority group at the current level of the tree. However, according to Rule 2, since G_a (the group with the next indicator) has suitably high priority (it is the top priority group), G_a is selected over G_b. Therefore, R2 in this case overrules Rule 1. At the next level of the tree, since process G_c has the next indicator and P_a has the yield pointer, G_c is selected over P_a. As a result, P_c (the only child of G_c) is selected as the candidate process to run next.

The above examples explain that the next indicator can overrule both "top priority" and "yield." That is, a group/process with a next indicator can be selected over another group/process having a higher priority, as long as their priorities are sufficiently close (or equivalently, as long as the selected group has a "suitably high" priority). Additionally, a group (represented by an internal node of the tree) with both a next indicator and a yield indicator can be selected over another group/process having a higher priority, as long as their priorities are sufficiently close (or equivalently, as long as the selected group has a "suitably high" priority).

Figure 5:
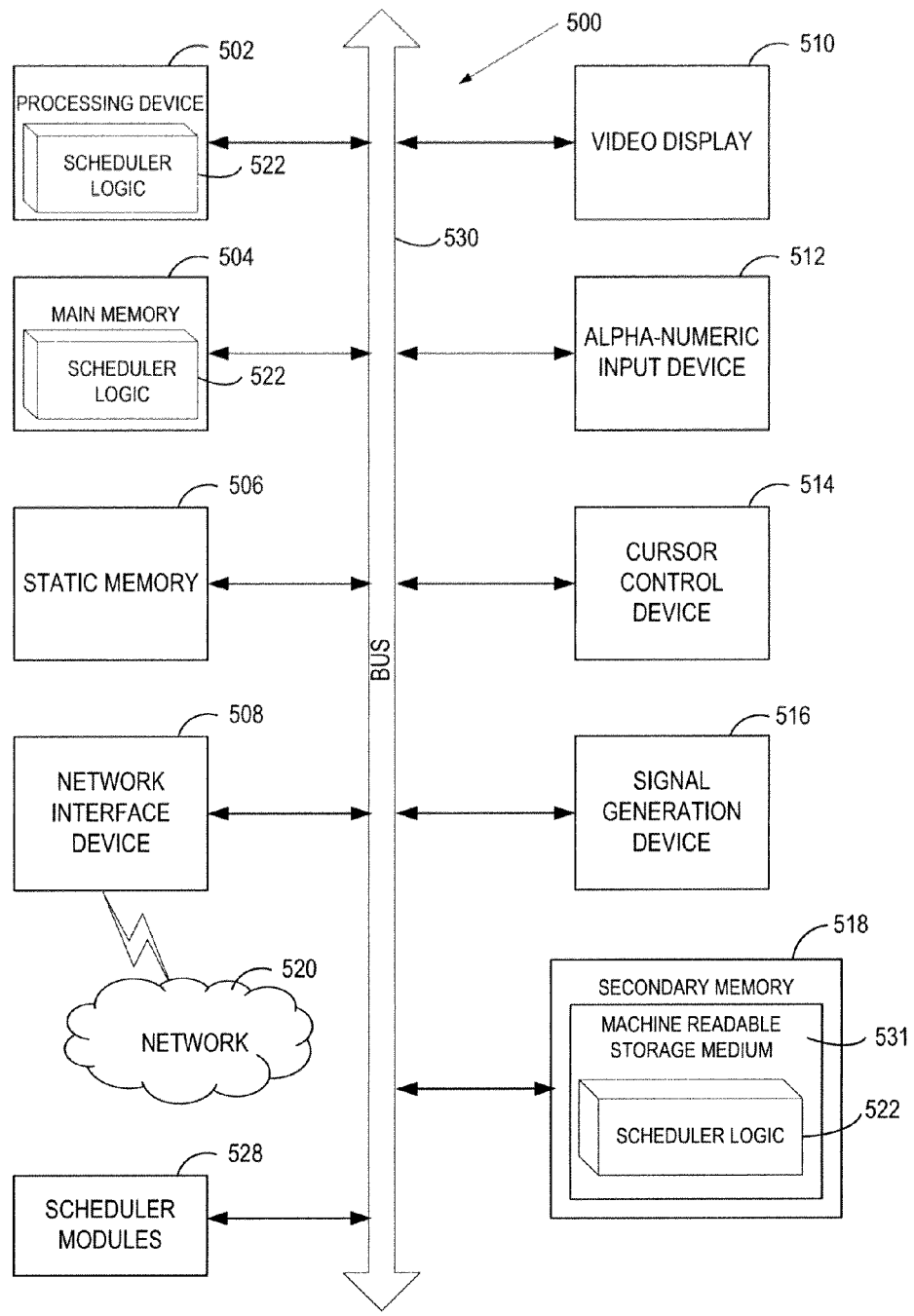
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute scheduler logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., the scheduler logic 522) embodying any one or more of the methodologies or functions described herein (e.g., the scheduler 128 of FIG. 1). The scheduler logic 522 may also reside, completely or at least partially, within the main memory 504 and/or within the processing device 502 during execution thereof by the computer system 500; the main memory 504 and the processing device 502 also constituting machine-readable storage media. The scheduler logic 522 may further be transmitted or received over a network 520 via the network interface device 508.

The machine-readable storage medium 531 may also be used to store the scheduler logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include scheduler modules 528 for implementing the functionalities of the scheduler 128 of FIG. 1. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "detecting", "completing", "monitoring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    assigning, by a processing device, a yield indicator to a first node of a scheduling tree, wherein the scheduling tree represents a hierarchy of groups and processes that share central processing unit (CPU) time, wherein the first node represents a first process that temporarily yields the CPU time, and wherein the yield indicator indicates that the first process has yielded CPU time to another process;
    assigning, by the processing device, the yield indicator to each of ancestor nodes of the first node in the scheduling tree, each ancestor node representing a group to which the first process belongs;
    assigning, by the processing device, a next indicator to a leaf node in the scheduling tree that represents a next process to run;
    assigning, by the processing device, the next indicator to each of ancestor nodes of the leaf node in the scheduling tree, each ancestor node representing a group to which the next process belongs; and
    selecting, by the processing device, the next process to run on a computer system based on the next indicator and the yield indicator in the scheduling tree.

2. The method of claim 1, wherein the scheduling tree comprises an internal node, which is assigned either one of the next indicator and the yield indicator.

3. The method of claim 1, wherein the scheduling tree comprises an internal node, which is assigned both of the next indicator and the yield indicator.

4. The method of claim 1, wherein each node in the scheduling tree is assigned a priority, the method further comprising:
    at each level of the scheduling tree, selecting a next highest priority node at the level if a top priority node at the level has the yield indicator.

5. The method of claim 1, wherein each node in the scheduling tree is assigned a priority, the method further comprising:
    at each level of the scheduling tree, selecting a node with the next indicator if the priority of the node is within a predetermined range of a top priority at the level.

6. The method of claim 1, wherein each node in the scheduling tree is assigned a priority, the method further comprising:
    at each level of the scheduling tree, selecting an internal node with both the next indicator and the yield indicator if the priority of the internal node is within a predetermined range of a top priority at the level.

7. A system comprising:
    a memory to store a scheduling tree that represents a hierarchy of groups and processes that share central processing unit (CPU) time; and
    a processing device coupled to the memory, the processing device is to:
        assign a yield indicator to a first node of the scheduling tree, the first node representing a first process that temporarily yields the CPU time, wherein the yield indicator indicates that the first process has yielded CPU time to another process, wherein each node in the scheduling tree is assigned a priority, and wherein, at each level of the scheduling tree, the processing device selects a next highest priority node at the level if a top priority node at the level has the yield indicator;
        assign the yield indicator to each of ancestor nodes of the first node in the scheduling tree, each ancestor node representing a group to which the first process belongs; and
        select a second process to run on the processing device based on the yield indicator in the scheduling tree.

8. The system of claim 7, wherein the processing device is to:
    assign a next indicator to a leaf node in the scheduling tree that represents a next process to run; and
    assign the next indicator to each of ancestor nodes of the leaf node in the scheduling tree, wherein each ancestor node represents a group to which the next process belongs.

9. The system of claim 8, wherein the scheduling tree comprises an internal node, which is assigned either one of the next indicator and the yield indicator.

10. The system of claim 8, wherein the scheduling tree comprises an internal node, which is assigned both of the next indicator and the yield indicator.

11. A non-transitory computer readable storage medium comprising instructions that, when executed by a processing device, cause the processing device to perform operations comprising:
    assigning, by the processing device, a yield indicator to a first node of a scheduling tree, wherein the scheduling tree represents a hierarchy of groups and processes that share central processing unit (CPU) time, wherein the first node represents a first process that temporarily yields the CPU time, wherein the yield indicator indicates that the first process has yielded CPU time to another process, and wherein each node in the scheduling tree is assigned a priority;
    at each level of the scheduling tree, selecting an internal node with both a next indicator and the yield indicator if the priority of the internal node is within a determined range of a top priority at the level;
    assigning the yield indicator to each of ancestor nodes of the first node in the scheduling tree, each ancestor node representing a group to which the first process belongs; and
    selecting a second process to run on a computer system based on the yield indicator in the scheduling tree.

12. The non-transitory computer readable medium of claim 11, the operations further comprising:
- assigning the next indicator to a leaf node in the scheduling tree that represents a next process to run; and
- assigning the next indicator to each of ancestor nodes of the leaf node in the scheduling tree, each ancestor node representing a group to which the next process belongs.

13. The non-transitory computer readable medium of claim 12, wherein the internal node is assigned either one of the next indicator and the yield indicator.

14. The non-transitory computer readable medium of claim 12, wherein the internal node is assigned both of the next indicator and the yield indicator.

15. The non-transitory computer readable medium of claim 11, wherein the operations further comprise:
- at each level of the scheduling tree, selecting a next highest priority node at the level if a top priority node at the level has the yield indicator.

* * * * *